UNITED STATES PATENT OFFICE.

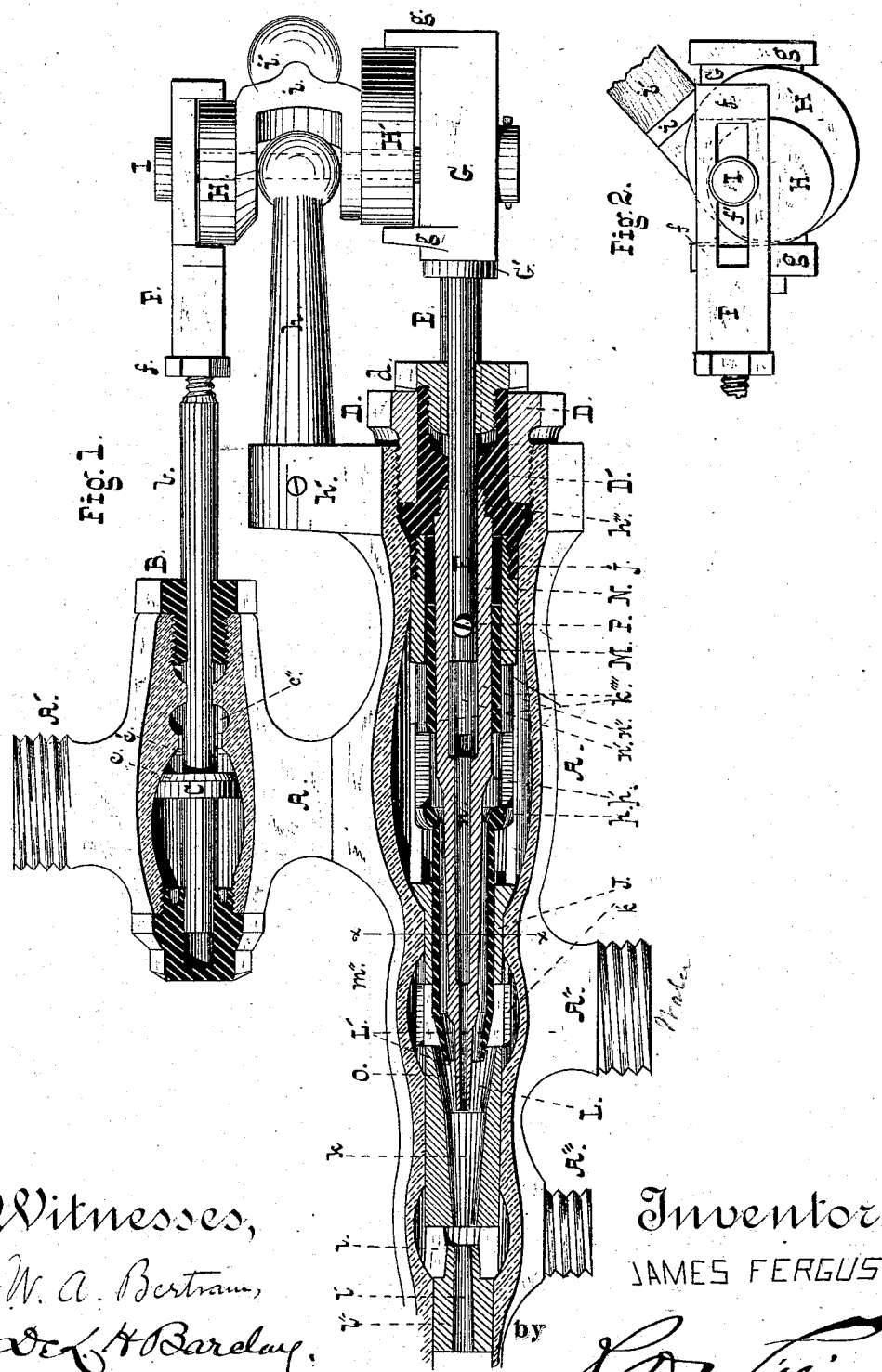

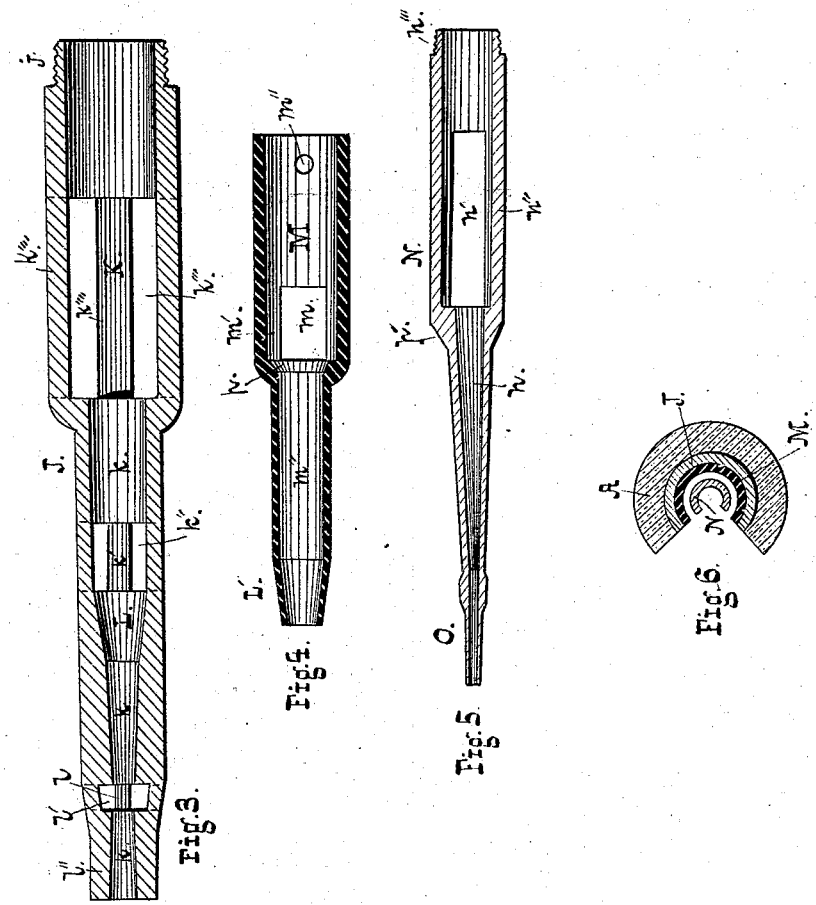

JAMES FERGUS, OF PHILADELPHIA, PENNSYLVANIA.

INJECTOR.

SPECIFICATION forming part of Letters Patent No. 237,263, dated February 1, 1881.

Application filed September 1, 1880. (No model.)

*To all whom it may concern:*

Be it known that I, JAMES FERGUS, of the city and county of Philadelphia, State of Pennsylvania, have invented certain new and useful Improvements in Injectors; and I hereby declare the same to be fully, clearly, and exactly described as follows, reference being had to the accompanying drawings, in which—

Figure 1 is a side elevation of the device, partly in section, a quadrant of certain parts which are cylindrical in cross-section being cut away in order to show their internal construction. Fig. 2 is a top plan of the lever and cams, one for opening the steam and the other for regulating the steam and water supply. Fig. 3 is a central longitudinal sectional view of the central removable tube. Fig. 4 is a similar view of the steam-plug for regulating the steam and water supply. Fig. 5 is a similar view of the steam-jet tube, and Fig. 6 is a cross-section of the device on the line X X of Fig. 1.

My invention relates to injectors for steam-boilers; and it consists in certain improvements upon that for which Letters Patent were granted to me March 7, 1876, No. 174,509, and April 17, 1877, No. 189,715.

The object of my invention is to secure an admission of steam to the jet of the injector in advance of the opening of the steam-plug, which regulates the steam-supply, which end I attain by means of a double cam-lever actuating the steam-valve and steam-plug, the cams being set in such manner as to start the former slightly in advance of the latter.

Specifically, my invention consists in certain details of construction and combination of parts, as hereinafter fully described, and made the subject of the claims.

In the accompanying drawings, A is the main shell of the device, having steam-inlet A', water-inlet A'', and overflow-chamber A'''. Within the steam-chamber reciprocates a rod, $b$, carrying a disk-valve, C, having a tapering face, $c$, adapted to seat closely against the conical seat or lip $c'$. From the chamber $c''$ the steam which passes the valve enters the body of the injector. The end of the rod $b$ is screwed into the yoke F, slotted at $f'$, where it is secured by a jam-nut, $f$. On the shell A is formed a lug, $h'$, from which projects a pillar, $h$, through which passes a pin, I. On this pin are mounted a pair of cams, H H', connected to a yoke, $i$, having a handle, $i'$, as shown.

E is a rod which operates the steam-plug, which regulates both the steam and water supply, and it is secured to a yoke, G, having lugs $g$, that embrace the cam H'. A swivel-nut, G', secures the rod to the yoke, and is designed to effect any desired adjustment of the cam H'.

It is obvious that as the handle $i'$ is turned the cams H and H' cause the rods E and $b$ to move longitudinally, opening or closing the steam and water ports. These cams are so arranged that the steam-valve is moved slightly in advance of the steam-plug, securing the end above referred to.

Into the end of the shell A is screwed a nut, D, which secures the entire contents of the shell in place. Into the nut D' is inserted a stuffing-nut, $d$, through which the rod E passes.

J is the central removable tube, which fits closely within the shell A, except at the chambers opposite the steam, water, and overflow pipes, where it is cut away, as shown in Fig. 3, leaving ports or openings $k'''$ $k''$ $l'$ and arms K $k''''$ $k'$ $l$.

To the end of the tube J is screwed a nut, D', against which the nut D bears. The opposite end of the tube J is reduced in exterior diameter, as shown at $l''$, and its bore $k$ is provided with a conical seat, L, against which the tapering end of the steam plug or tube M fits closely. This latter tube slides closely within the tube J, and has lateral openings $m$ and arms $m'$. Its bore $m''$ is also furnished with a conical seat, $p$, for the tapering part $p'$ of the steam-jet tube N, and it is directly connected with the rod E by means of a screw, P, which enters a hole and passes freely through the slot $n'$ of the tube N. This latter has the usual jet-nozzle O and bore $n$, and is attached at $h''''$ to the nut D'. It will thus be seen that the tubes J and N are rigidly attached to the main shell A, while the tube M is susceptible of a longitudinal motion between them, its motion in one direction causing the valve or tapering end L' to seat home in the neck L of the tube J, thereby closing the water-orifice, while a reverse motion seats the valve $p'$ against the part $p$.

In operation, as the handle $i'$ is moved to the side, the partial rotation of the cams H and H' causes the valve C to leave its seat, thereby admitting steam to the jet of the injector, and the seat $p$ is also projected forward away from the conical part $p'$ of the steam-pipe N. As above stated, the cam H is moved slightly in advance of the rod E, which is driven by the cam H', whereby the steam passes through the jet, expels the air, and the injector is filled with water before any escape is permitted between the cone L' and seat L. The further movement of the handle gradually throws the steam-valve open, and at the same time moves the steam-plug which regulates both the steam and water supply for any pressure of steam the boiler may have.

The threaded end of the rod $b$ and the jam-nut $f$ admit of the nicest adjustment of the relative throws of the rods $b$ and E, while the peculiar arrangement of parts admits of the device being readily taken to pieces for cleaning or repairs. To do this it is only necessary to remove the pin I, when the handle $i'$ and cams may be slid laterally from between the yokes, and the subsequent unscrewing of the nut D admits of the entire contents of the shell A being drawn out and taken apart.

What I claim is—

1. In an injector, a steam-valve and steam-plug actuated by means of connected cams, which are so arranged as to start the steam-valve in advance of the steam-plug, as set forth.

2. In combination with the steam-chamber having valve C and rod $b$, the steam-plug provided with rod E, the said rods being adjustably secured to their respective cam-yokes, as set forth.

3. In combination with the shell A, having steam-chamber provided with the piston-valve and lip $c'$, the removable tube J, steam-plug M, jet-tube N, and mechanism, substantially as described, for actuating the steam-valve and steam-plug, as set forth.

4. In combination with the shell having steam-chamber and valve, the nut D', securing the tubes J and N, the intermediately-reciprocating steam-plug, and mechanism, substantially as described, for actuating the steam-valve and steam-plug, as set forth.

5. In combination with the shell having tubes J and N and steam-plug M, the pillar $h$, yokes F G, cams H H', and handle $i'$, as set forth.

6. In combination with the shell having steam-chamber A', water-chamber A'', and overflow-chamber A''', the lug $h'$, pillar $h$, cams H H', slotted yokes E G, and rods for actuating the steam-valve and steam-plug, as set forth.

7. In combination with the slotted yokes and cams H H', the lever $i'$ and rods for actuating the steam-valve and steam-plug, as set forth.

8. The combination of the yokes F G, having lips which embrace the cams, and longitudinal slots through which passes the pin I, with the rods for actuating the steam-valve and steam-plug, as set forth.

JAMES FERGUS.

Witnesses:
THOS. J. HUNT,
PETER BOYD.